Oct. 4, 1949.  A. H. BURSKI  2,483,622
FENDER WELT CLIP
Filed Feb. 26, 1947
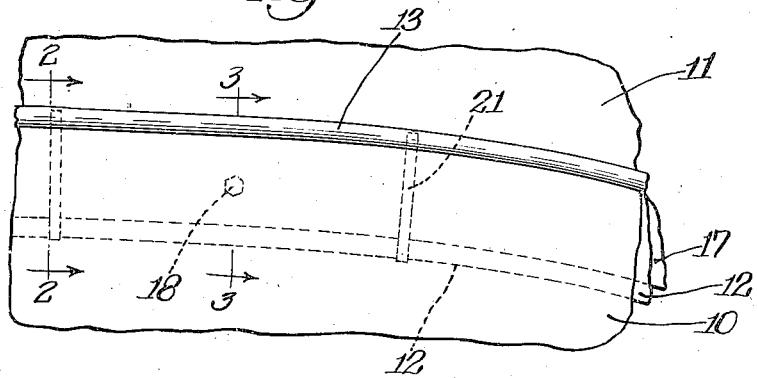
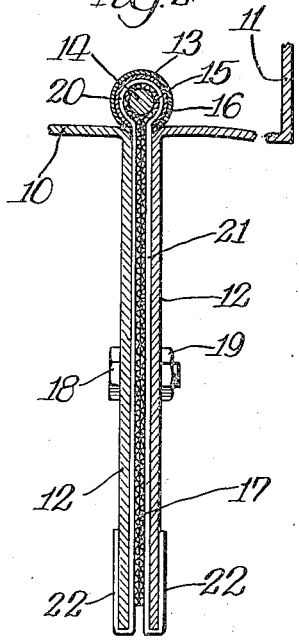 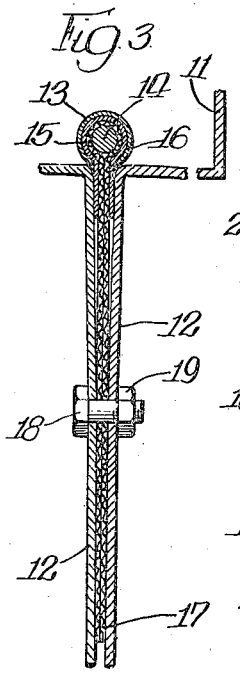 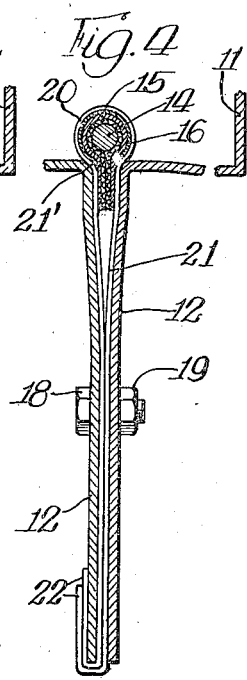 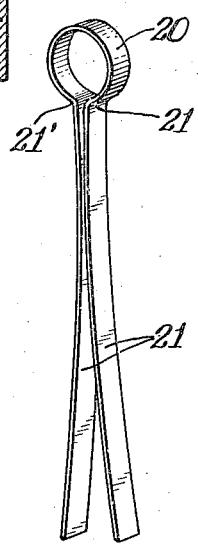
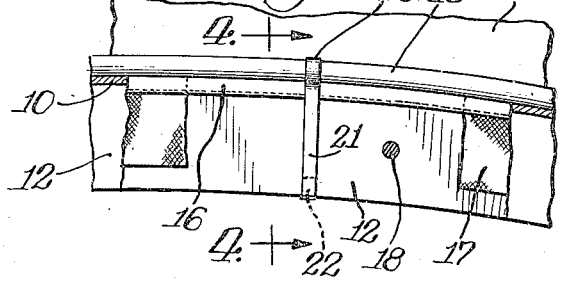
INVENTOR.
Anthony H. Burski Patented Oct. 4, 1949

2,483,622

UNITED STATES PATENT OFFICE 2,483,622

FENDER WELT CLIP

Anthony H. Burski, Chicago, Ill.

Application February 26, 1947, Serial No. 730,883

2 Claims. (Cl. 280—153.5)

In motor vehicles, fender and body have a joint which is formed by bent marginal edges, between which a fabric welt or filler is interposed, and said marginal edges with the welt therebetween connected by bolts. The welt usually is held by one edge within a metallic bead which extends above the plane of the fender and the adjacent portion of the body. Frequently the welt breaks or tears longitudinally and adjacent the bead, as a consequence of which the bead remains loose and becomes disconnected from the joint. This causes squeaking and rattling when the vehicle is in motion. Therefore, the principal object of the present invention is the provision of a comparatively simple device for engaging the loose bead for binding or anchoring the same to the fender and the body of a vehicle at the joint formed thereby.

A still further object of the present invention is the provision of a clip consisting of a pair of arms, including a looped end, in which the bead may be engaged, and in which the arms thereof are anchored or engaged at the marginal edges of the fender and body, which form a joint therebetween, for anchoring the bead to said edges.

While the clip in its use above stated is intended as a repair fixture, the invention also contemplates the use of the clip as a permanent adjunct placed in the joint, and connected with the bead during the assembly of a vehicle. In this latter use the device will hold the bead tied to the joint, thereby preventing tearing of the welt.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views:

Fig. 1 is a fragmentary side elevational view of a fender showing the present clip when initially permanently connected with the bead;

Fig. 2 is an enlarged cross-sectional view through the joint formed by fender and body of a vehicle with the clip in a permanent connection with the bead, the view having been taken on line 2—2 of Fig. 1;

Fig. 3 is an enlarged cross-section on line 3—3 of Fig. 1;

Fig. 4 is an enlarged cross-sectional view on line 4—4 of Fig. 6, illustrating the clip when used as a repair fixture for retaining the bead in an operative position with the joint regardless of the condition of the welt;

Fig. 5 is a perspective of the clip constituting the present invention; and

Fig. 6 is a side elevational view of the fender-body joint, with fender partially removed, with the clip in an operative position when used as a repair fixture.

Referring in detail to the present drawing there is shown therein fender 10 and body 11 of a vehicle. Along their opposed edges each is provided with an integrally formed and downwardly depending marginal strip 12, the two strips forming a joint for said fender 10 and body 11. Said fender 10 and body 11 diverge from strips 12 substantially along a horizontal plane. Normally hollow metallic bead 13 is placed over the joint formed by two strips 12 and is made to contact with the corners defined by each strip 12 and the adjacent portion of fender 10 and body 11, respectively. Retained within bead 13 is cord 14, welt loop 15 surrounding it, and protective strip 16 of oil or rubberized cloth surrounding said loop 15. All of said parts 14, 15 and 16 constitute a filler for bead 13. Two free leaves of loop 15 constitute welt 17 which extends from bead 13 and is passed between strips 12. Strip 16 likewise extends by its free ends into the space defined by strips 12 but not as far as welt 17, all as best shown in Fig. 3. A plurality of bolts 18, in a spaced longitudinal relation pass through apertures in strips 12 and welt 17, and with engaging nuts 19 maintain welt 17 in clamped position within the pair of strips 12 thereby providing a joint for fender 10 and body 11 with bead 13 overlying the same. Welt 17, with engaging bolt 18 and nut 19 maintain bead 13 in its operative position with relation to said joint. Welt 17 is usually made of a rubberized fabric.

As long as the parts hereinabove described remain undamaged the joint aforesaid is firm. It happens however that welt 17, often tears longitudinally of the joint, thereby releasing bead 13 from its close contact with the corners defined by strips 12 and the respective portions of fender 10 and body 11, causing the same to squeak or rattle as it rubs the adjacent portions of fender 10 and body 11 due to the vibration occasioned by the motion of the vehicle. Hence the provision of the present clip to anchor bead 13 firmly against the joint formed by fender 10 and body 11 as hereinabove described.

The clip, best shown in Fig. 5, is made of a single oblong metallic strip, suitably formed to define loop 20 with a pair of arms 21 projecting from said loop 20. Said arms 21 are longer than the width of strips 12.

In the event welt 17 becomes torn or broken the same may be removed by forcing it downwardly using a knife or any other suitable tool and extending the same past said bead 13 and between strips 12 in order to force a piece of welt to extend below the free terminations of strips 12. Manual pull upon the damaged portion of welt 17 thus extended will tear off such piece of welt 17 as is desired to be removed from between strips 12. In Fig. 6 there is illustrated welt 17 when a piece thereof was broken and removed from between strips 12.

However, it is not absolutely necessary to remove the torn or broken piece of welt 17 from between strips 12. The same may be left there.

Thereupon the next step in the operation is resorted to. Namely, the clip by its free ends is extended past bead 13, so that each end thereof passes the point of normal contact therebetween and each of the two corners defined by each strip 12 and the respective adjacent portion of fender 10 and body 11. Then the two arms of the clip are forced into the space between strips 12 and in the space freed by the removal of the damaged portion of welt 17, or extended past the damaged welt portion when the same is left between strips 12. This operation is continued until loop 20 of the clip comes in contact with the periphery of bead 13 as is shown in Figs. 4 and 6. The clip is made of a comparatively soft or malleable metal so as to facilitate this operation. When loop 20 is brought in contact with the periphery of bead 13 the free ends of arms 21 extend beyond the free edges of strips 12. These free edges are thereupon bent into opposite directions so as to engage each with each strip 12 as is seen in Fig. 2, and indicated by 22, or both of said arms may be engaged to only one strip 12, as seen in Fig. 4. This will firmly anchor bead 13 to the joint due to the engagement of the clip with bead 13 and strips 12. Or arms 21 may be engaged with only one of strips 12. Loop 20 with the adjacent portions of arm 21 defines opposed corners 21' within which are seated the corners defined by strips 12 and diverging body portions of fender 10 and body 11, as seen in Fig. 4.

While Figs. 4 and 6 illustrate the clip as a repair fixture with loop 20 thereof disposed outwardly of bead 13, Figs. 1 and 2 illustrate the clip as a permanent fixture added into the assembly of the joint during the manufacture of the vehicle. In this last instance loop 20 of the clip is embedded within bead 13 and interposed between welt loop 15 and cloth 16, with arms 21 extended from bead 13 and interposed between welt 17 and the adjacent strips 12. When thus used the clip will not only maintain bead 13 in position in the joint, but will also prevent any stresses in the joint which would cause tearing of welt 17.

While there is described herein a preferred embodiment of the present invention, it is nevertheless to be understood that minor changes may be made therein without departing from the spirit and scope of the invention as claimed.

What I claim as new is:

1. In combination, in a vehicle a body and fender detachably connected together, plates affixed to said body and fender in face-to-face relationship forming a joint therebetween, an anti-rattle protective member gripped between said plates in said joint, said protective member comprising a welt having leaves separating said plates and a bead overlying the external line of contact between said plates adjacent the connection at the body and fender, and metal clips embracing the bead and leaves of said protective member located at spaced intervals along said welt and being inserted between said plates, each clip comprising an elongated flat narrow strip bent back on itself with a circular loop formed at the bend thereof encircling the bead of said welt, and elongated shanks on said loop extending beyond the inner edges of said plates, said elongated shanks being bent over the inner edge of at least one of said plates and holding the protective member and bead in place.

2. In combination, in a vehicle a body and fender detachably connected together, plates affixed to said body and fender in face-to-face relationship forming a joint therebetween, an anti-rattle protective member gripped between said plates in said joint, said protective member comprising a welt having leaves separating said plates and a bead overlying the external line of contact between said plates adjacent the connection at the body and fender, and soft metal clips embracing the bead and leaves of said protective member located at spaced intervals along said welt and being inserted between said plates, and a tubular metallic covering encasing said bead and said clips, each clip comprising an elongated flat narrow strip bent back on itself with a circular loop formed at the bend thereof encircling the bead of said welt, and elongated shanks on said loop extending beyond the inner edges of said plates, said elongated shanks being bent over the inner edge of at least one of said plates and holding the protective member and bead in place.

ANTHONY H. BURSKI.

REFERENCES CITED

The following references are of record in the file of this patent:

UNITED STATES PATENTS

| Number | Name | Date |
|--------|------|------|
| 1,907,044 | Crowe | May 2, 1933 |
| 2,013,598 | Brooke | Sept. 3, 1935 |
| 2,065,843 | Van Uum | Dec. 29, 1936 |
| 2,240,288 | Crowe | Apr. 29, 1941 |